United States Patent
St-Pierre et al.

(10) Patent No.: US 10,937,236 B1
(45) Date of Patent: Mar. 2, 2021

(54) MESH SMOOTHING FOR VISUAL QUALITY AND ANALYSIS IMPROVEMENT

(71) Applicant: Bentley Systems, Incorporated, Exton, PA (US)

(72) Inventors: Mathieu St-Pierre, Ste-Brigitte de Laval (CA); Elenie Godzaridis, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/680,081

(22) Filed: Nov. 11, 2019

(51) Int. Cl.
  *G06T 17/20* (2006.01)
  *G06F 16/901* (2019.01)
  *G06T 5/00* (2006.01)

(52) U.S. Cl.
  CPC ............ *G06T 17/20* (2013.01); *G06F 16/901* (2019.01); *G06T 5/002* (2013.01)

(58) Field of Classification Search
  CPC ........ G06T 17/20; G06T 5/002; G06F 16/901
  See application file for complete search history.

(56) References Cited

U.S. PATENT DOCUMENTS

| | | | |
|---|---|---|---|
| 9,082,220 B2 | 7/2015 | Mukherjee | |
| 2006/0267978 A1* | 11/2006 | Litke | G06T 17/30 345/419 |
| 2006/0290695 A1* | 12/2006 | Salomie | G06T 17/20 345/420 |
| 2007/0120850 A1 | 5/2007 | Xie et al. | |
| 2007/0120851 A1 | 5/2007 | Xie et al. | |
| 2013/0249912 A1 | 9/2013 | Schmidt | |
| 2013/0257853 A1 | 10/2013 | Schmidt | |
| 2014/0152664 A1* | 6/2014 | Le Meur | G06T 3/40 345/428 |
| 2016/0314616 A1* | 10/2016 | Su | G06T 7/344 |

OTHER PUBLICATIONS

"Autodesk ReCap Help," Autodesk Inc., <https://help.autodesk.com/view/RECAP/2018/ENU/?guid=RealityCapture_Photo_edit_model_edit_model_content_html>, Nov. 2019, pp. 1-3.

(Continued)

*Primary Examiner* — Xilin Guo
(74) *Attorney, Agent, or Firm* — Cesari and McKenna, LLP; James A. Blanchette

(57) ABSTRACT

In example embodiments, techniques are provided for smoothing a mesh to remove unwanted bumpiness on regular surfaces. In one example embodiment, an editor determines a capture shape (e.g., a user-specified capture shape) that and then extracts a set of vertices of a multi-resolution mesh that include vertices that intersect the capture shape. The editor generates a fitted shape from the extracted set of vertices that more precisely defines the portion of the mesh to be smoothed, the fitted shape to have at least one of a different size or a different orientation than the capture shape. The editor then modifies the vertices that fall within or close to the fitted shape to change their coordinates to smooth the portion of the multi-resolution mesh. The modified vertices are persisted to a storage device for subsequent display or analysis.

20 Claims, 16 Drawing Sheets

(56) References Cited

OTHER PUBLICATIONS

"ContextCapture Quick Start Guide: Software to Automatically Generate Detailed 3D Models from Photographs," ContextCapture CONNECT Edition, Reality Modeling, Bentley, Mar. 15, 2017, pp. 1-34.

"Laplacian Smooth Modifier," Blender 2.79 Manual, Blender, <https://docs.blender.org/manual/en/2.79/modeling/modifiers/deform/laplacian_smooth.html>, Sep. 12, 2017, pp. 1-4.

Lievendag, Nick, "RealityCapture Photogrammetry Software Review," Updated for 2018: RealityCapture Review, 3D Scan Expert, <https://3dscanexpert.com/realitycapture-photogrammetry-software-review/>, Mar. 15, 2018, pp. 1-19.

Salino, Marco, "Shrinkwrapper Tool—New Tech Preview Tool in MicroStattion CONNECT Edition Update 8," Bentley Systems, Incorporated, <https://communities.bentley.com/products/microstation/b/microstation_blog/posts/shrinkwrapper-tool---new-tech-preview-feature-in-microstation-connect-edition-update-8>, Feb. 22, 2018, pp. 1-2.

"Smooth Modifier," Blender 2.79 Manual, Blender, <https://docs.blender.org/manual/en/2.79/modeling/modifiers/deform/smooth.html>, Sep. 12, 2017, one page.

* cited by examiner

MESH SMOOTHING FOR VISUAL QUALITY AND ANALYSIS IMPROVEMENT

BACKGROUND

Technical Field

The present disclosure relates generally to techniques for editing a mesh according to a geometric object serving as a guide, and more specifically to techniques for smoothing unwanted bumpiness in regular surfaces in a mesh.

Background Information

A number of types of software applications may generate a multi-dimensional mesh (e.g., a two-dimensional (2-D), two-and-a-half-dimensional (2.5-D), three-dimensional (3-D), four-dimensional (4-D), etc. mesh) that represents a portion of the physical environment (e.g., one or more objects, structures, terrain, etc.). Such a multi-dimensional mesh (hereinafter referred to simply as a "mesh") may be a multi-resolution textured mesh, which includes multiple levels of detail (LODs).

One type of software application that may generate a multi-resolution textured mesh is a structure from motion (SfM) photogrammetry application, such as the ContextCapture™ application available from Bentley Systems, Inc. A SfM photogrammetry application may operate to generate a mesh composed of faces (e.g., triangles) formed from vertices connected by edges. The mesh may be generated based on a set of images (e.g., photographs), point clouds, or other representations of the real-world captured by one or more cameras, scanners, etc. The generating often include reconstruction, texturing and annotation, and retouching. Reconstruction may involve several stages, including a draft reconstruction stage, a refinement stage, and a simplification stage. Texturing and annotation may include a texturing stage and a pixel-level mapping stage. Retouching may include editing geometry and textures based on automated processes and/or user input to correct visual artifacts and improve visual quality of the generated mesh.

While SfM photogrammetry may produce meshes that include a number of types of visual artifacts, one pervasive visual artifact is that regular surfaces (i.e. smooth surfaces in differential geometry, such as a plane, semi-plane, cylinder, etc.) often appears bumpy rather than smooth. This unwanted bumpiness is not only visually unappealing, it can also introduce errors if the mesh is used in analysis or animation.

FIG. 1 is a view of a mesh 100 that includes a road surface 110 generated by SfM photogrammetry that includes unwanted bumpiness. In addition to being visually unappealing, such bumpiness in the road surface 110 may introduce errors in analysis or animation of the road. For example, if the mesh were analyzed to calculate the surface area of the road, the bumpiness may produce a value that is too large, or if the mesh was animated to show automobiles moving down the road, they may be displaced erratically up and down over the bumps, creating an unrealistic effect.

Such unwanted bumpiness is not limited to road surfaces, but may be found in other regular surfaces generated by SfM photogrammetry, for instance any surface that has shininess in the set of images. FIG. 2 is a view of a mesh 200 that includes a wall of a structure 210 with windows 220 generated by SfM photogrammetry includes unwanted bumpiness. Window glass is typically very difficult to model correctly using SfM photogrammetry. Since the glass typically looks different depending on the angle it is viewed from it is often difficult to find tie points on images taken from different points of view. As with the road in FIG. 1, the bumpiness of the wall 210 and windows 220 in FIG. 2 is visually unappealing, and may introduce errors in analysis or animation.

FIG. 3 is a view of a mesh 300 that includes a pipe 310 generated by SfM photogrammetry that includes unwanted bumpiness. Cylindrical objects also are very difficult to model correctly using SfM photogrammetry as they tend to have fewer key points than planar surfaces, since they may appear similar from different points of view. As with the road in FIG. 1. and the wall 210 and windows 220 in FIG. 2, the bumpiness of the pipe 310 is visually unappealing, and may introduce errors and visual artifacts in analysis or animation.

Various attempts have been made to provide smoothing tools to address the issue of bumpiness in regular surfaces in meshes. However, such attempts suffered a number of shortcomings. Many of the attempted techniques do not handle or well-handle multi-resolution data. Likewise, many of the techniques scale poorly and are unsuited for use with the very large meshes that may be produced via modern SfM photogrammetry using high-resolution photographs and/or via modern LiDAR. Further some attempted techniques can be cumbersome to use, lacking simple and effective mechanisms for determining target surfaces to smooth, requiring use of multiple applications, and/or requiring access to source data from which the mesh was generated (e.g., images in the case of SfM photogrammetry).

Accordingly, there is a need for improved techniques for smoothing a mesh that may address some or all of these shortcomings.

SUMMARY

In various example embodiments, techniques are provided for smoothing a mesh to remove unwanted bumpiness on regular surfaces. The technique may involve determining a capture shape, extracting a set of vertices "near" the capture shape, generating a fitted shape from the extracted vertices and then modifying vertices that fall within or close to the fitted shape. The techniques may well-handle large multi-resolution textured meshes generated by SfM photogrammetry or point cloud surface reconstruction, require only simple, straightforward user-input, and generally do not require access to source data from which the mesh was generated. The techniques may be readily integrated in an editor within the software architecture of a larger application (e.g., a SfM photogrammetry application), or as a standalone editor, depending on the implementation.

In one example embodiment, an editor determines a capture shape (e.g., a user-specified capture shape) that encompasses a portion of a multi-resolution mesh (e.g., a multi-resolution textured mesh), and then extracts a set of vertices of the multi-resolution mesh that include vertices that intersect the capture shape, or a shape derived from the captured shape through geometric operations (e.g., projection along a normal vector, defining a box of user-defined depth, etc.). The editor generates a fitted shape from the extracted set of vertices that more precisely defines the portion of the multi-resolution mesh to be smoothed. Typically, the fitted shape has a different size or a different orientation than the capture shape. The editor then modifies the vertices that fall within, or within a predetermined distance of, the fitted shape to change their coordinates to smooth the portion of the multi-resolution mesh. Vertices that are sufficiently far away are not smoothed. The modified vertices are persisted to a storage device for subsequent display or analysis.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

The description refers to the accompanying drawings of example embodiments, of which.

DETAILED DESCRIPTION

Figure 4:
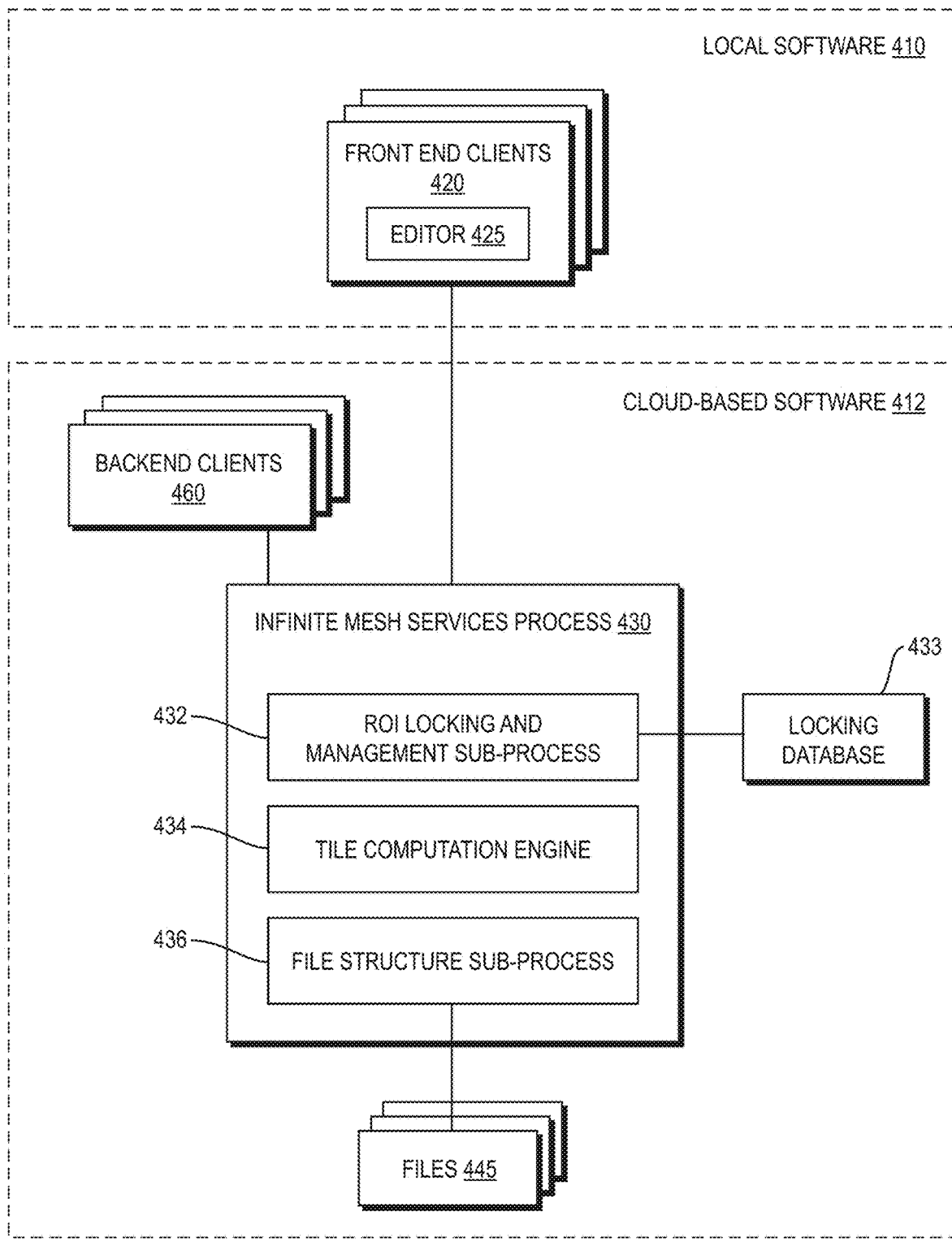
FIG. 4 is a high-level block diagram of an example software architecture for a SfN photogrammetry application that includes editing functionality to smooth unwanted bumpiness in regular surfaces.

FIG. 4 is a high-level block diagram of an example software architecture 400 for a SfM photogrammetry application that includes editing functionality to smooth unwanted bumpiness in regular surfaces. The mesh is preferably a multi-resolution textured mesh that represents a portion of the physical environment (e.g., one or more objects, structures, terrain, etc.). However, it should be understood that the software architecture 400 may also adapted for use with textured meshes of a single resolution.

In one embodiment, the software architecture 400 operates to generate the mesh based on a set of images (e.g., photographs) of the real-world captured by a camera or cameras (not shown). However, it should be understood that other forms of source data may additionally, or alternatively, be utilized. For example, source data may include data captured by LiDAR, RGB-D cameras, mobile phone cameras, or other types of sensors.

The sensors may be static, or mounted to mobile terrestrial or airborne platforms. The software architecture 400 is divided into local software 410 that executes on one or more computing devices local to an end-user (collectively "local devices") and cloud-based software 412 that is executed on one or more computing devices remote from the end-user (collectively "cloud computing devices"), accessible via a network (e.g., the Internet). Each computing device may include processors, memory, storage systems, and other hardware (not shown) for executing software and storing data. The local software 410 includes frontend clients 420 each operating on different local devices. The frontend clients 420 may provide a variety of functions, including providing a graphical user-interface (GUI) for displaying the mesh and receiving user input. In some implementations, the frontend clients 420 includes an integrated editor 425. In other implementations, the editor 425 may be a standalone software application (not shown), or part of another software application (not shown). The editor 425 is usable to perform retouching operations (e.g., to remove visual artifacts) and analysis operations (e.g. to generate cross sections, extract models, extract edge lines, produce vertical orthoimages, etc.). As discussed below, the retouching operations may include smoothing the mesh (e.g., the multi-resolution texture mesh) to remove unwanted bumpiness on regular surfaces.

The cloud-based software 412 includes backend clients 460 that may provide a variety of functions, including performing reconstruction, texturing and annotating operations, as well as other processing intensive operations. To improve performance, the backend clients 460 may each be executed on different cloud computing devices. In some cases, the backend clients 460 may be executed as different threads, such that they operate independently even when executed on the same cloud computing device. The frontend clients 420 and backend client 460 (collectively "clients") typically operate concurrently, with multiple clients 420, 460 conducting reads and writes to edit portions of the mesh in parallel.

An infinite mesh services process 430 coordinates operation of the SfM photogrammetry application and provides access to the mesh to clients 420, 460. The infinite mesh services process 430 may include a number of subprocesses including a region of interest (ROI) locking and management process 432 that may maintain a region locking database 433, a tile computation engine 434 that computes, addresses and update tiles which store portions of mesh data, and a file structure process 436 that organizes data of tiles for storage. It should be understood that the infinite mesh services process 430 may also include a large number of other subprocesses, and that these specific subprocess are only mentioned herein for purposes of illustration.

The subprocesses of the infinite mesh services process 430 may operate to store the mesh as tiles maintained in files 445. Such storage may be structured according to any of a number of data structures. In one implementation, the data structures may take the form of an octree.

Figure 5:
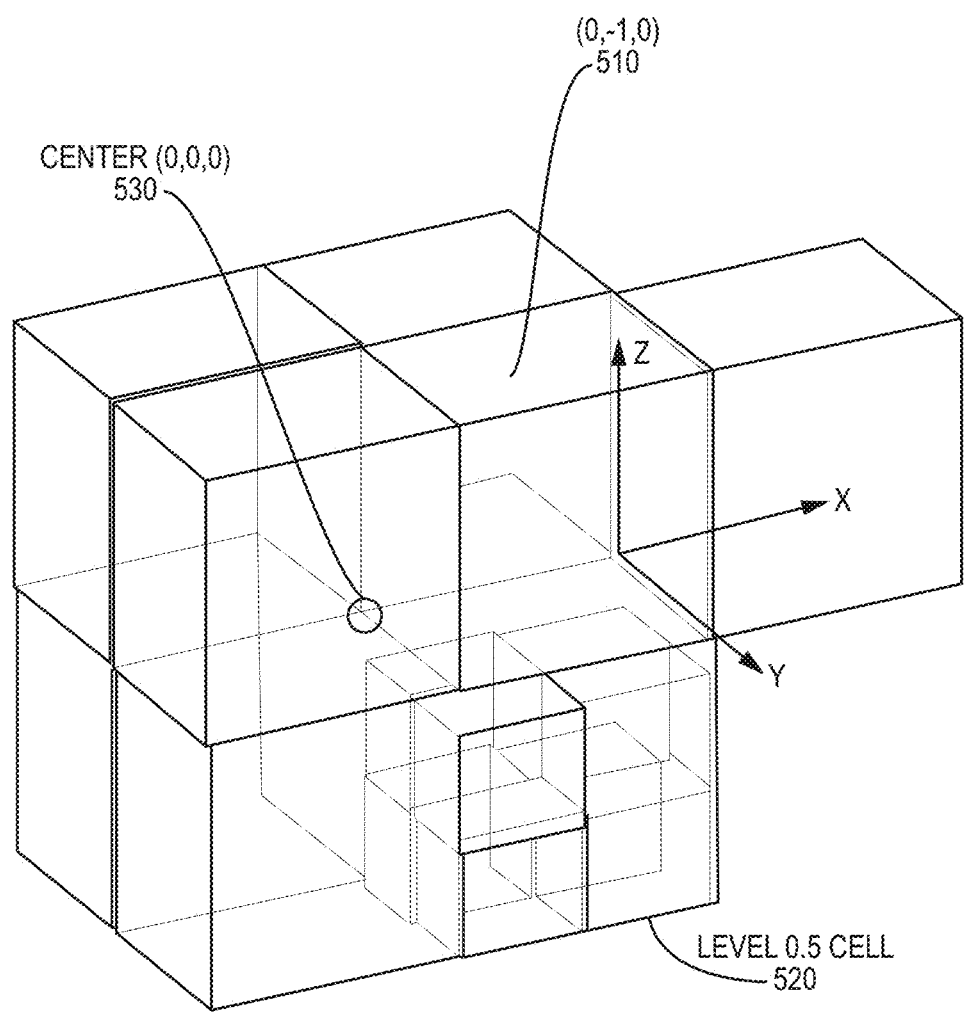
FIG. 5 is a diagram illustrating how a mesh may be organized by a spatial index, for example, an octree.

FIG. 5 is a diagram illustrating how a mesh may be organized by a spatial index, for example, an octree, a quad-octree, or other level of detail data structure. The octree is made up of cells (also referred to as tiles) which form a partition in the multi-dimensional space (e.g., 3D space). Tiles may be addressed by coordinates (e.g., three coordinates (i, j, k)) that represent the address of the tile. An additional parameter (e.g., a parameter (I)) may be associated with the tile to represent a level of the octree at which the tile is located, which indicates its size. At each level below the highest level, tiles may be half the size in each dimension as the tile immediately above it, but represent the space at a higher resolution. For example, a tile 510 (addressed by coordinates (0,−1, 0)) may have a level 1. A tile 520 may be half the size in each dimension as the tile 510, but represent this space at a higher resolution. The center of the octree, may be located at the bottom corner of the tile 530 at coordinates (0,0,0) on level 1. The mesh stored in the octree may be accessed and updated by editor 425 when performing retouching operations, including smoothing the mesh to remove unwanted bumpiness on regular surfaces.

Figure 6:
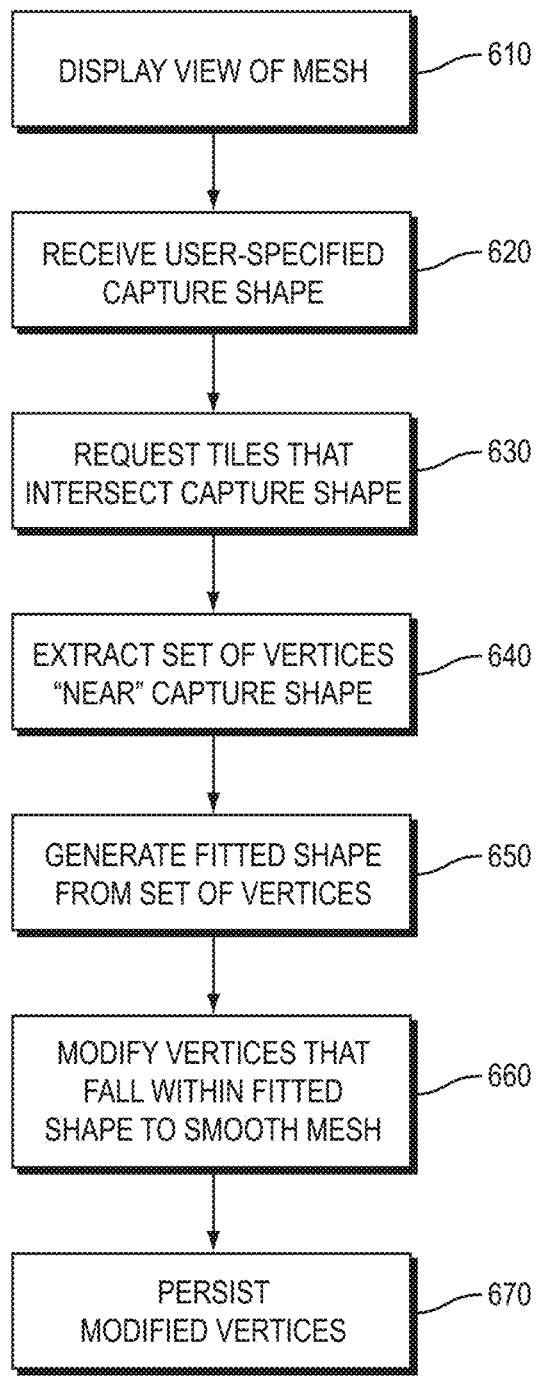
FIG. 6 is a flow diagram of an overall sequence of steps for smoothing a mesh to remove unwanted bumpiness.

FIG. 6 is a flow diagram of an overall sequence of steps 600 for smoothing a mesh to remove unwanted bumpiness. At step 610, the editor 425 displays in a GUI a view of the mesh, along with user interface elements and tools used in the smoothing process. At step 620, the edit 425 determines a capture shape that encompasses a portion of the mesh. For example, the editor 435 may receive in the GUI (e.g., via use of a drawing tool) a user-specified capture shape. The capture shape typically approximates the portion to be smoothed and may be any of a variety of supported regular shapes (e.g., a cylinder, a rectangular prism, a sphere, etc.). At step 630, the editor 425 requests tiles of the mesh that interest the capture shape. In the case of a multi-resolution textured mesh, such request typically includes tiles at all resolutions. At step 640, the editor 425 extracts a set of vertices from the tiles of the mesh that are "near" the capture shape or a shape derived from the captured shape through geometric operations. In this context, "near" refers to vertices that intersect a shape, and vertices that are outside the shape but within a tolerance distance thereof. At step 650, the editor generates a fitted shape from the extracted vertices that more precisely defines the portion of the mesh to be smoothed. The fitted shape may be the same type of shape as the capture shape (e.g., if the capture shape is a cylinder the fitted shape may also be a cylinder), or a different type of shape as the capture shape (e.g., if the capture shape is a rectangular prism the fitted shape may be a plane). In either case, the fitted shape typically has a somewhat different size and/or orientation than the capture shape as it is based on actual vertices rather than a user's approximation. At step 660, the editor 425 modifies vertices that fall within or close to the fitted shape, changing their coordinates to smooth the mesh. In the case of a multi-resolution textured mesh, vertices at all resolutions are modified. At step 670, the editor 425 persists the modified vertices creating edited tiles. Again, in the case of a multi-resolution textured mesh, edited tiles at all resolutions may be created. The edited tiles are stored yielding a smoothed version of the mesh.

Figure 1:
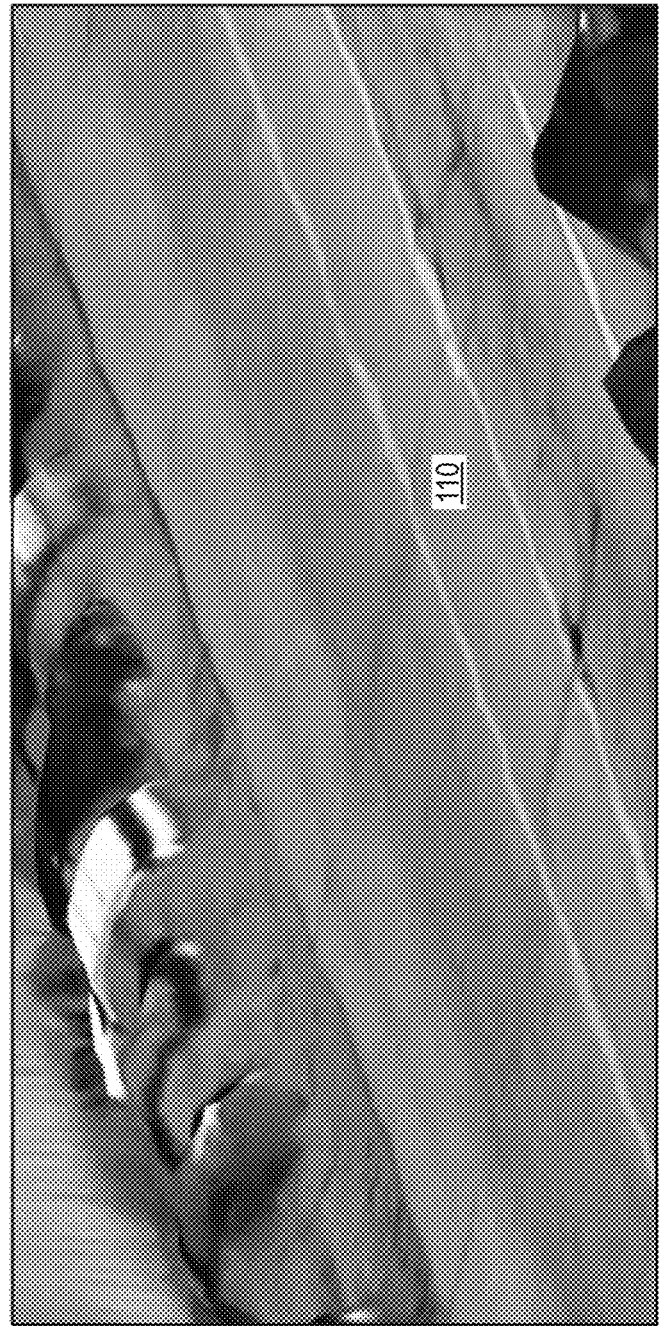
FIG. 1 is a view of a mesh that includes a road surface generated by SfN photogrammetry that includes unwanted bumpiness.
Figure 2:
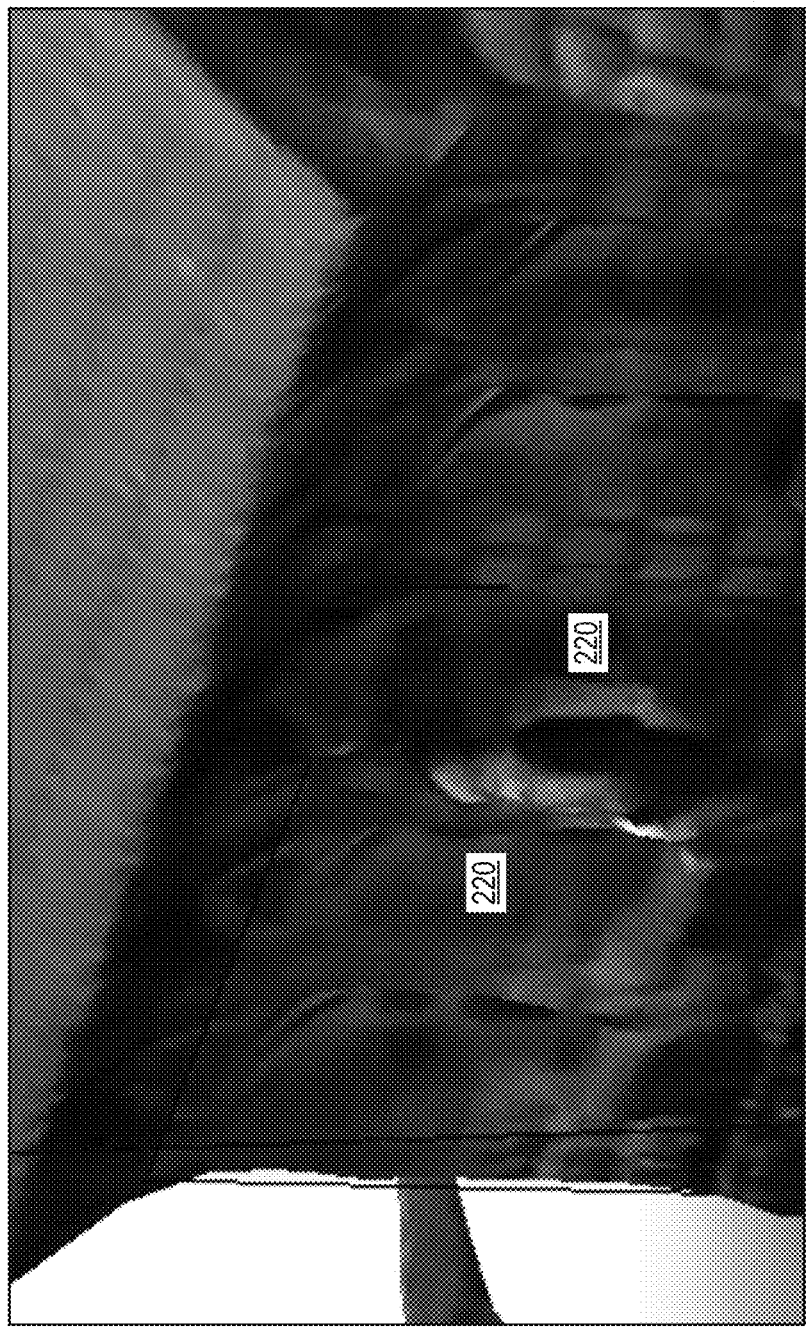
FIG. 2 is a view of a mesh that includes a wall of a structure with windows generated by SfN photogrammetry includes unwanted bumpiness.
Figure 3:
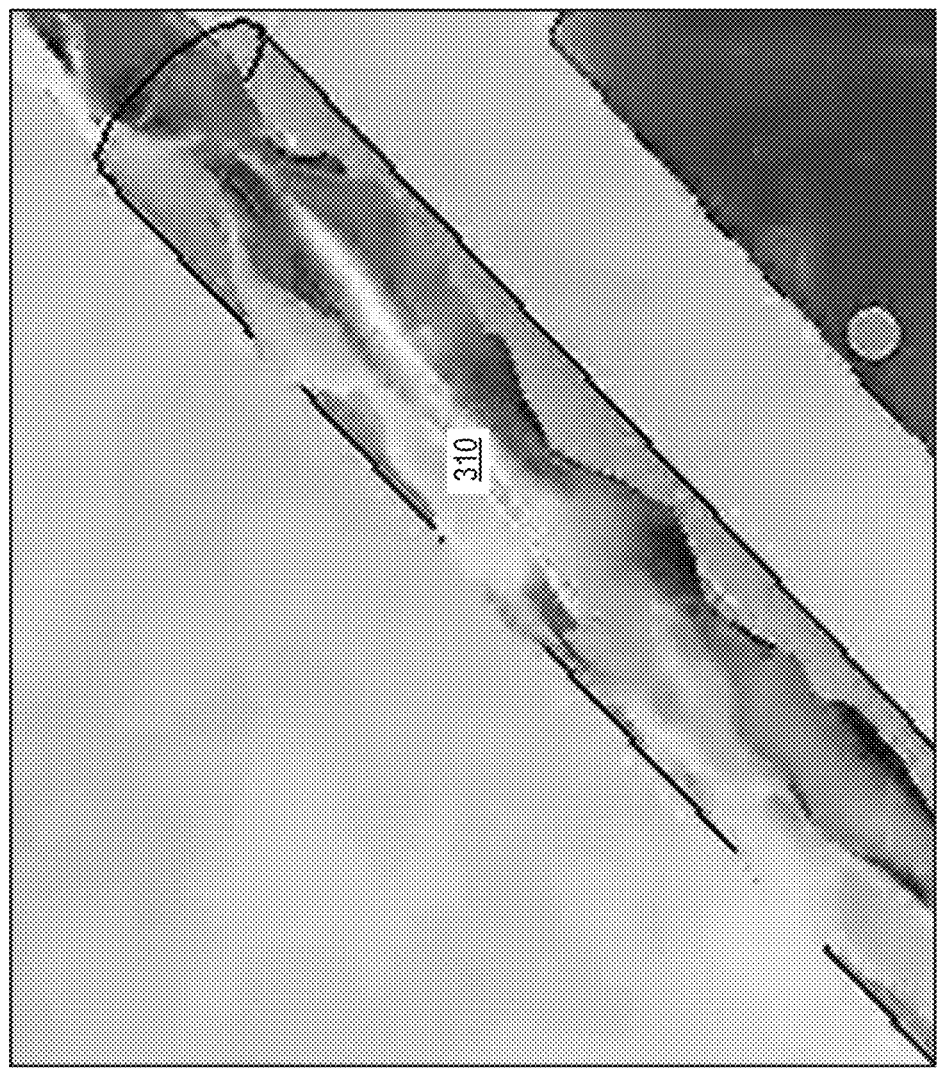
FIG. 3 is a view of a mesh that includes a pipe generated by SfN photogrammetry that includes unwanted bumpiness.
Figure 7:
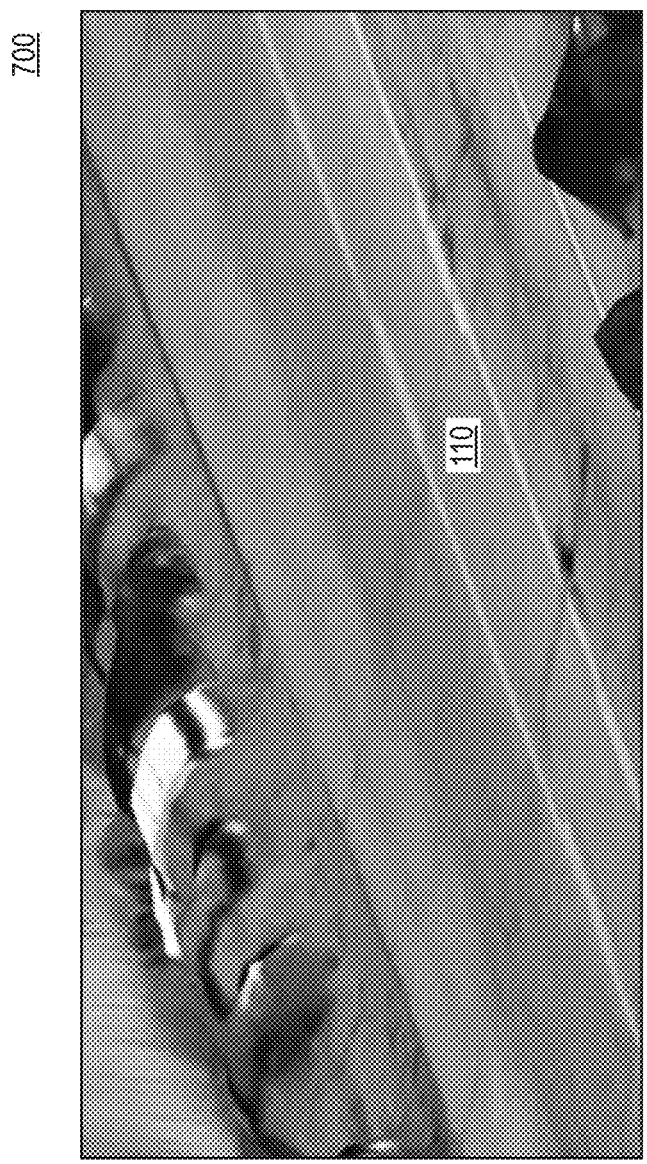
FIG. 7 is a view of a smoothed version of the mesh from FIG. 1.
Figure 8:
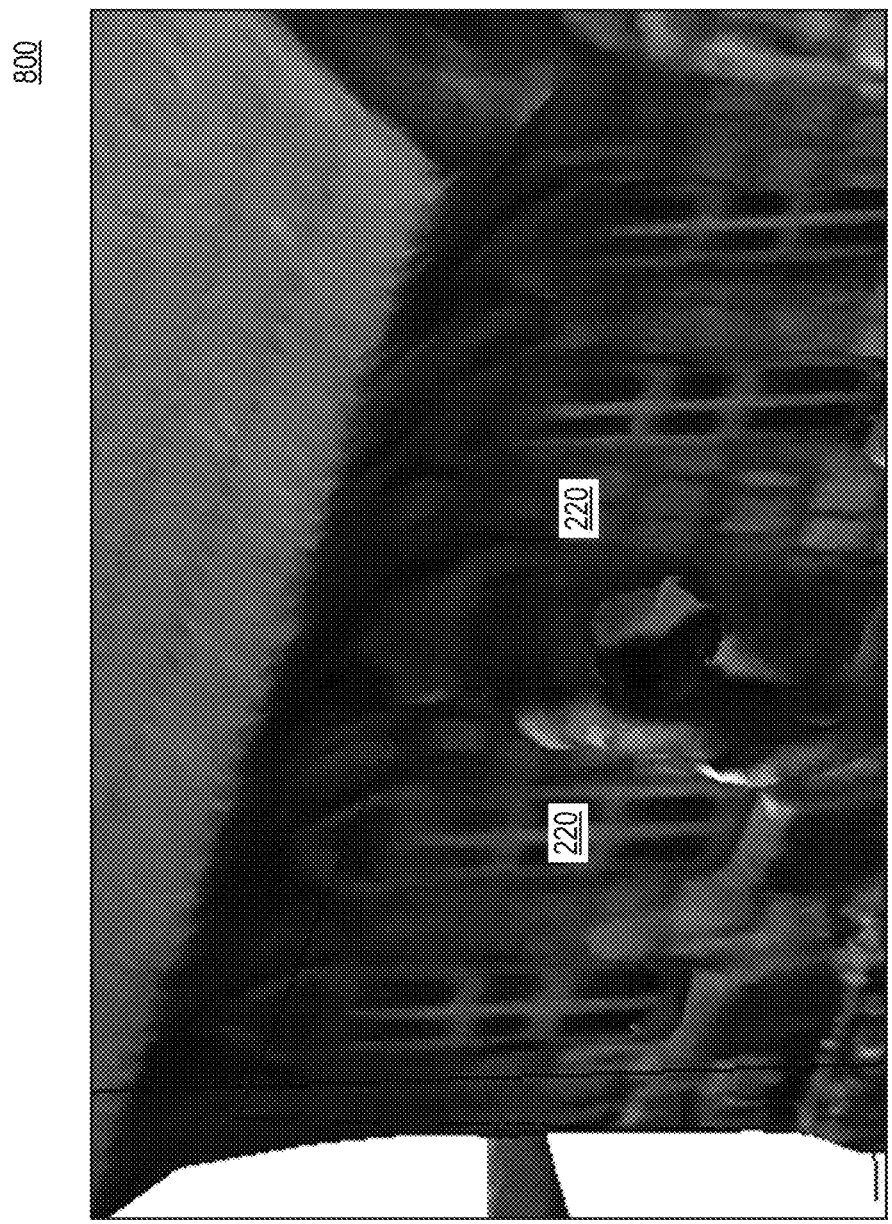
FIG. 8 is a view of a smoothed version of the mesh from FIG. 2.
Figure 9:
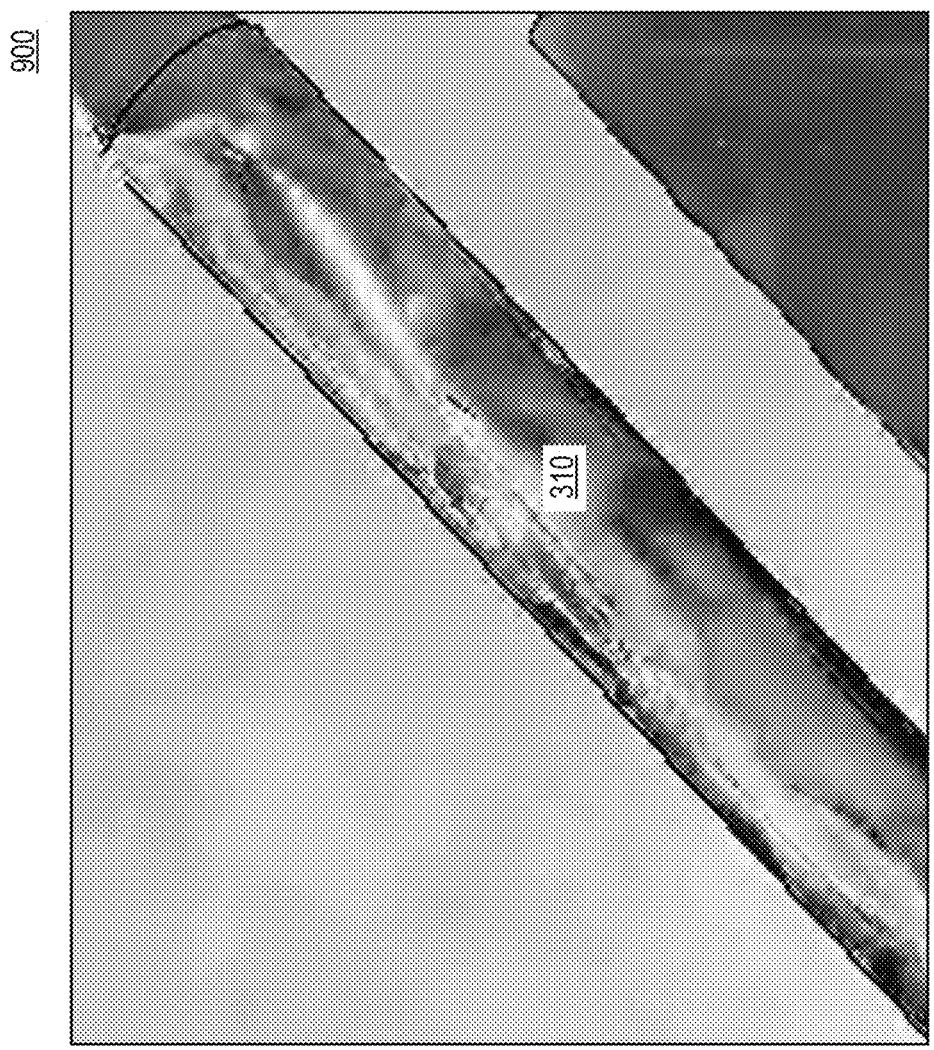
FIG. 9 is a view of a smoothed version of the mesh from FIG. 3.

The results of the sequence of steps 600 are illustrated in FIGS. 7-9. FIG. 7 is a view of a smoothed version 700 of the mesh 100 from FIG. 1. As can be seen, the bumpiness in the road surface 110 has been substantially removed. FIG. 8 is a view of a smoothed version 800 of the mesh 200 from FIG. 2. As can be seen, the bumpiness in the wall of structure 210 with windows 220 has been reduced. Likewise, FIG. 9 is a view of a of a smoothed version 900 of the mesh 300 from FIG. 3. As can be seen, the bumpiness in the pipe 310 has been substantially removed.

Figure 10:
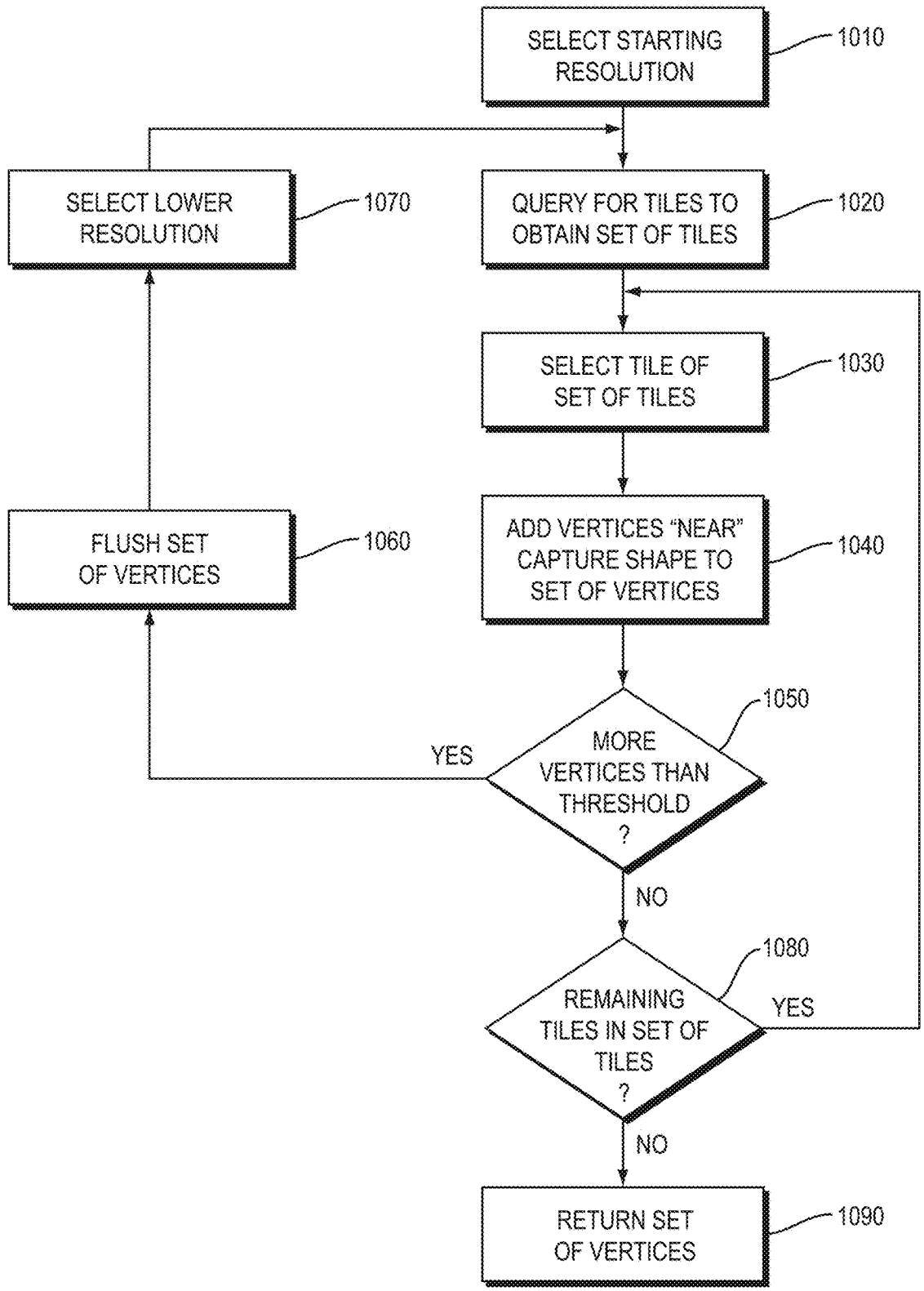
FIG. 10 is a flow diagram of an example sequence of steps that may be executed as part of steps to extract a set of vertices from tiles of a mesh that are "near" a capture shape.

Each of the steps in the sequence 600 may include a number of sub-steps executed by the editor 425 and/or other software of the software architecture 400. FIG. 10 is a flow diagram of an example sequence of steps 1000 that may be executed as part of step 640 to extract a set of vertices from the tiles of the mesh that are "near" the capture shape. The example in FIG. 10 assumes the mesh is a multi-resolution textured mesh. At step 1010, the editor 425 selects a starting resolution based on a pre-determined setting or user-input. Different approaches may be used to select the starting resolution. For example, to obtain the best precision, the editor 425 may select the highest resolution available in the multi-resolution textured mesh. To provide faster processing at the expense of less precision, the editor may select a lower resolution from those available. At step 1020, the editor 425 queries for tiles at the selected resolution to obtain a set of tiles. At step 1030, the editor 425 selects one of the set of tiles. At step 1040, the editor 425 adds vertices of the tiles that are "near" the capture shape or a shape derived from the captured shape through geometric operations to a set of vertices. The set of vertices may be initially empty. It may be desirable to add vertices that are outside the capture shape but within the tolerance distance for several reasons. One reason is that bumpiness in the mesh may cause some vertices to be displaced outside a best-fitted regular shape. Accordingly, to capture such vertices without requiring users to specify "oversized" capture shapes, a tolerance distance may be used.

At step 1050, the editor checks if the number of vertices in the set of vertices is greater than a threshold number. The threshold number may be chosen based on a number of factors. In one implementation, the threshold number is chosen based on both available resources (e.g., memory capacity) of the computing device the editor 425 is executing on, and resource requirements of subsequent steps of the method to ensure the method can be completed given the available resources and/or can achieve a baseline level of performance given the available resources. If the number of vertices exceeds the threshold number of vertices, execution proceeds to step 1060, where the set of vertices is flushed (removing the previously found vertices). Then, at step 1070, the editor 425 selects a lower resolution. Different approaches may be used to select the lower resolution. In one implementation, a resolution just one level below the current resolution is always selected. In another implementation, a resolution one or more levels below the current resolution is selected, the exact number of levels lower being chosen based on a heuristic. One heuristic that may be used involves comparison of the number of tiles already processed with the number of tiles in the set of tiles. If the threshold number of vertices is reached after processing only a small percentage of the set of tiles, a resolution several levels below may be selected, while if the threshold number of vertices is reached only after processing a majority of the tiles of the set of tiles, a resolution just one level below may be selected. After the lower resolution is selected, execution loops back to step 1020, where the editor 425 queries for tiles at the new resolution to obtain a new set of tiles, and execution proceeds forward with these.

If the number of vertices does not exceed the threshold at step 1050, execution proceeds to step 1080, where the editor 425 checks if there are one or more remaining tiles to process of the set of tiles. If so, execution loops back to step 1030, where another of the set of tiles is selected. If not, execution terminates at step 1090 where the set of vertices produced by the method is returned.

Figure 11B:
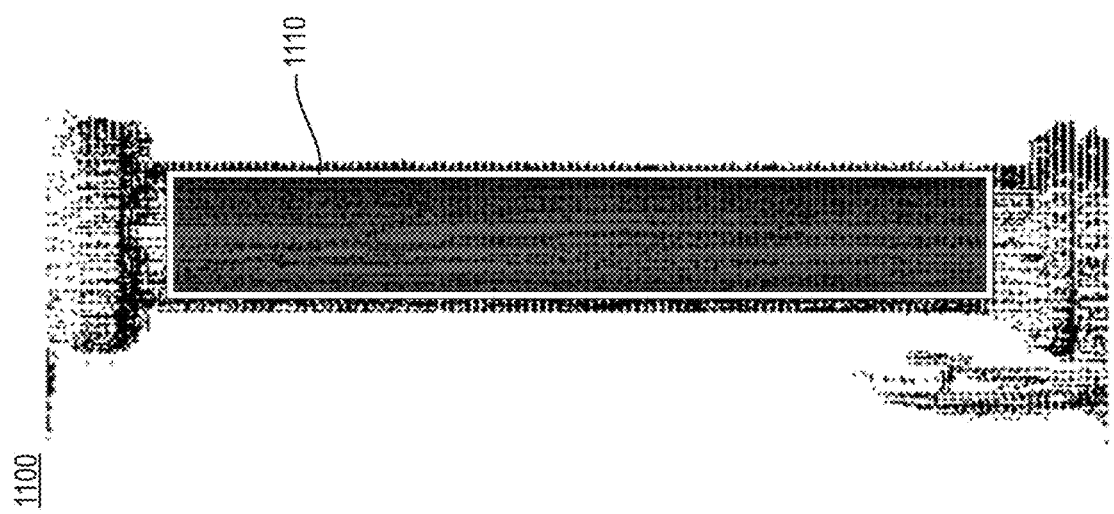
FIGS. 11A and 11B are a pair of diagrams illustrating generation of a fitted shape (e.g., a fitted cylinder) from a set of vertices "near" a capture shape (e.g., a capture cylinder) for an example involving a pipe.
Figure 11A:
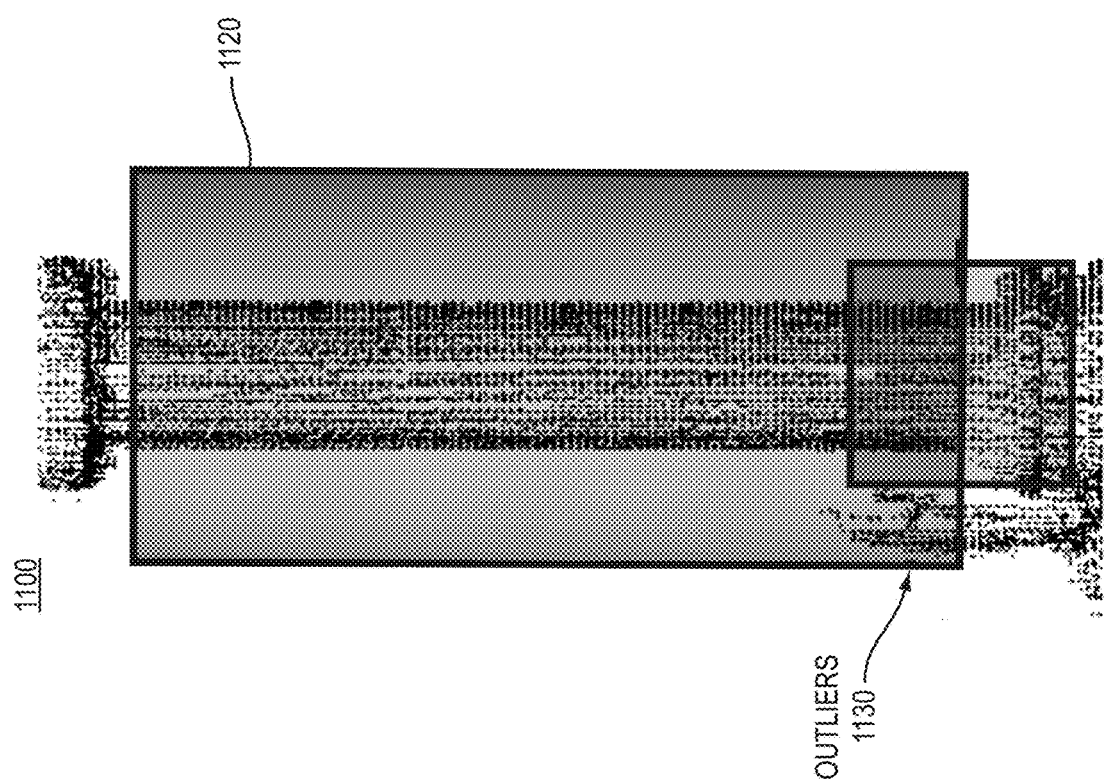

Once the set of vertices has been returned, they may be used to generate a fitted shape that more precisely defines the portion of the mesh to be smoothed. FIGS. 11A and 11B are a pair of diagrams 1100 illustrating generation of a fitted shape (e.g., a fitted cylinder) 1110 from a set of vertices "near" a capture shape (e.g., a capture cylinder) 1120 for an example involving a pipe. The set of vertices include those actually on the pipe, and outliers 1130. The outliers may fall within a capture shape that loosely surrounds the pipe, but should be excluded from the fitted shape that more precisely conforms to it.

Figure 12:
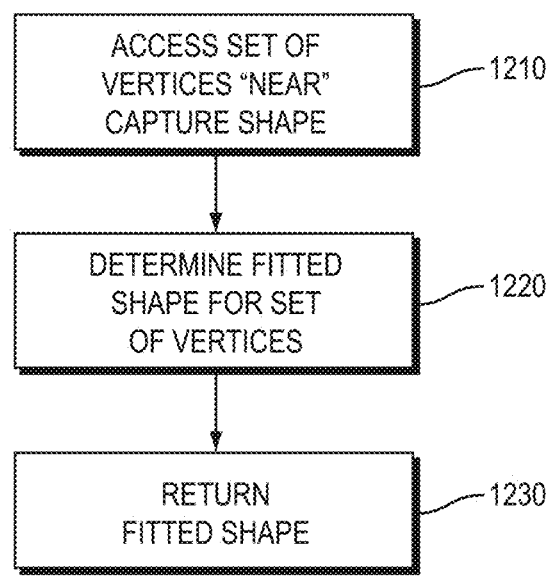
FIG. 12 is a flow diagram of an example sequence of steps that may be executed as part of a step to generate a fitted shape from a set of vertices.

FIG. 12 is a flow diagram of an example sequence of steps 1200 that may be executed as part of step 650 to generate a fitted shape from the set of vertices. At step 1210, the editor 425 accesses the set of vertices "near" the capture shape produced in step 640. Then, at step 1220, the editor 425 executes a fitting algorithm to determine a fitted shape that best represents the set of vertices. As mentioned above, the fitted shape may be the same type of shape as the capture shape (e.g., if the capture shape is a cylinder the fitted shape may also be a cylinder), or a different type of shape than the capture shape (e.g., if the capture shape is a rectangular prism the fitted shape may be a plane). Such determination may be based on predefined rules, user selection, or other mechanisms. Various different fitting algorithms may be used. In one implementation, the fitting algorithm may be a random sample consensus (RANSAC) algorithm. A RANSAC algorithm may be robust to vertices that accidentally intersect the capture shape and thereby are considered outliers (such as outliers 830 in FIG. 8). In another implementation, the fitting algorithm may be a linear regression algorithm. Regardless of its form, the fitting algorithm may define parameters that may be approximated or set by a user in the GUI. At step 1230 where the fitted shape is returned.

Figure 13:
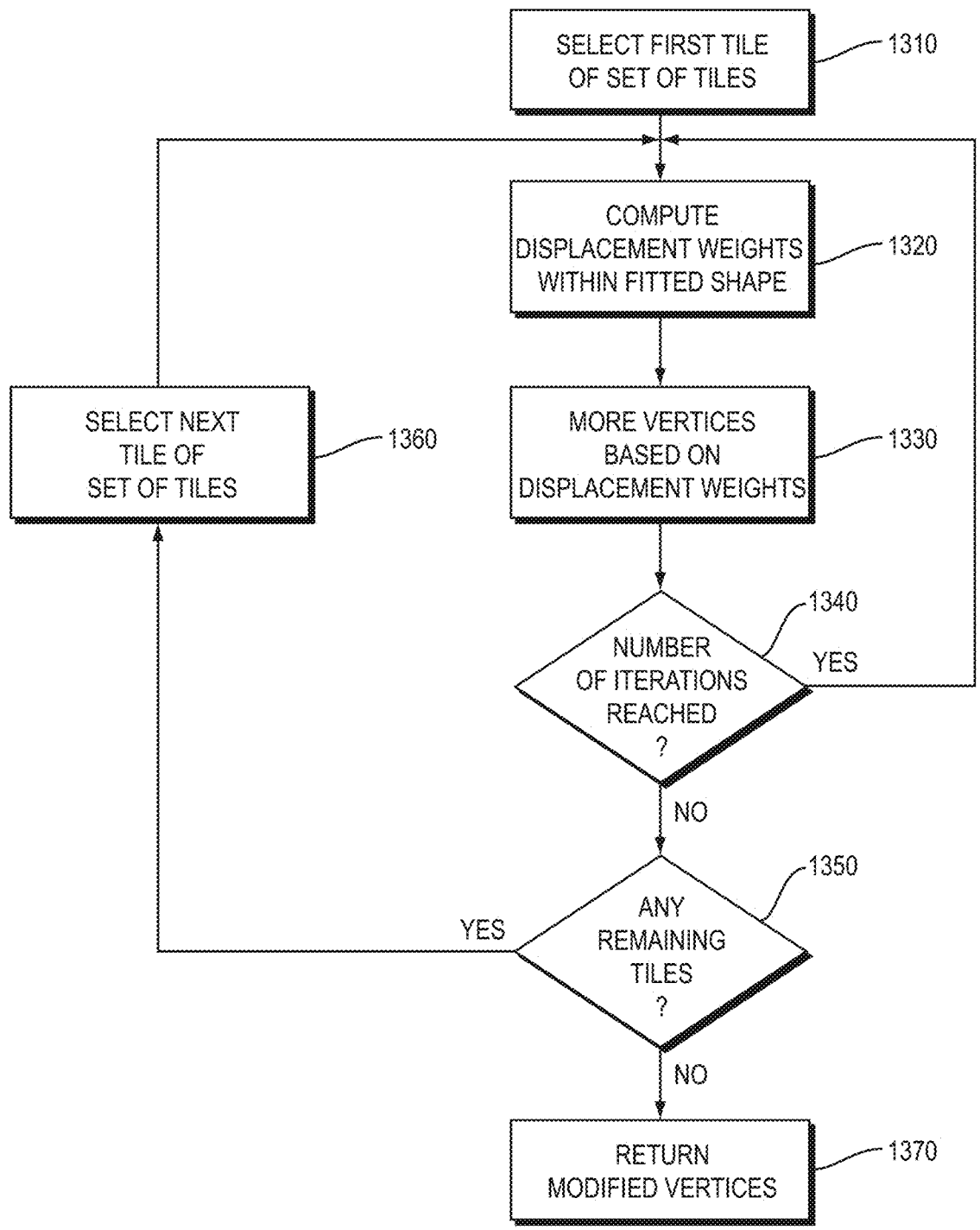
FIG. 13 is a flow diagram of an example sequence of steps that may be executed as part of a step to modify vertices that fall within or close to a fitted shape.

Once the fitted shape is obtained, the editor 425 modifies coordinates of vertices that fall within or close to the fitted shape to smooth the mesh. FIG. 13 is a flow diagram of an example sequence of steps 1300 that may be executed as part of step 660 to modify vertices that fall within or close to the fitted shape. At step 1310, the editor 425 selects one tile of the set of tiles that has vertices within the fitted shape. At step 1320, the editor computes displacement weights for each of the vertices within the fitted shape which indicate how much effect smoothing should have on the given vertex. The displacement weights may be calculated based on an algorithm that yields weights that are generally inversely proportional to the distance of the vertex to the surface of the fitted shape. In some implementations, a distance threshold may be employed in the algorithm such that vertices greater than the distance threshold from the surface may have their displacement weight set to zero. Use of a distance threshold may prevent unneeded computations as well as limit artifacts. Further, in some implementations, the shape of the surface may also be taken into account in determining the displacement weights. For example, vertices in less flat regions of the surface, or in regions having an orientation that substantially differ from an orientation of the surface, may be assigned higher displacement weights. Details of one possible algorithm to compute displacement weights are discussed further below.

Figure 14:
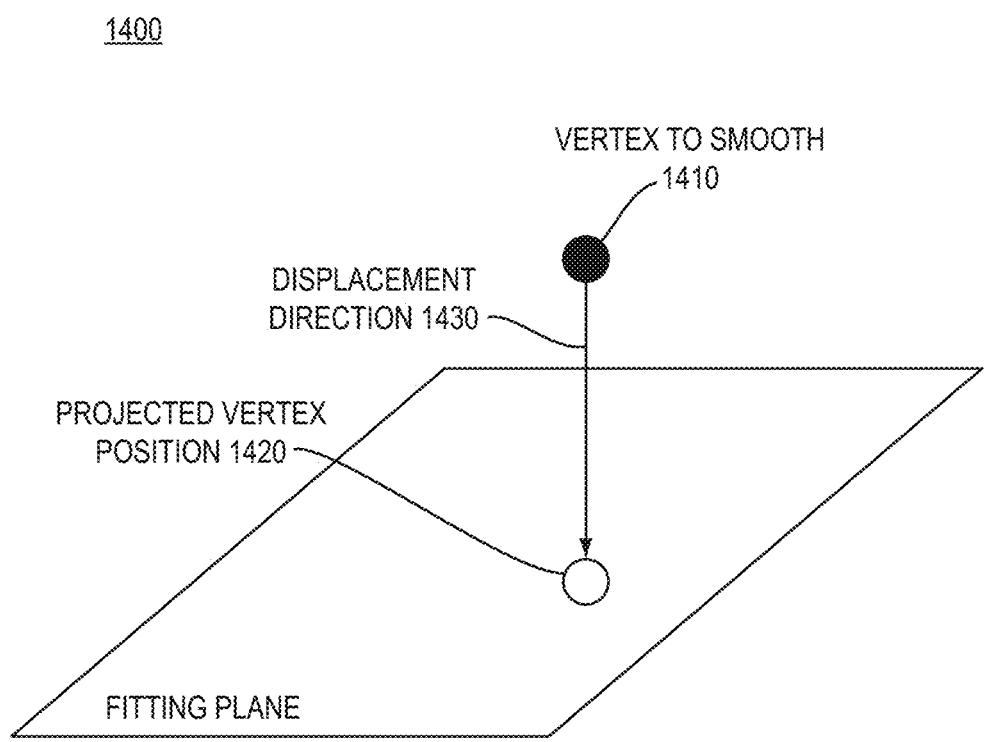
FIG. 14 is a diagram that illustrates an example of movement of a vertex in a displacement direction to smooth the surface of a mesh.

At step 1330, the editor 425 moves vertices within the fitted shape in a displacement direction by a displacement amount to smooth the surface of the mesh. The displacement direction is a direction toward the fitted shape, which may be determined by projecting the vertex thereto. The displacement amount is based on the displacement weight of the vertex and a smoothness parameter that indicates how much smoothing should be applied. The smoothness parameter may be set to a predetermined value (e.g., 1) or user-specified. FIG. 14 is a diagram 1400 that illustrates an example of movement of a vertex 1410 in a displacement direction to smooth the surface of a mesh. The displacement direction 1430 in this example is computed based on the position of the vertex 1410 and the position of a projected version of the vertex 1420 on the fitted shape, here a fitted plane. Pseudocode 1 below illustrates an example of movement of a vertex by a displacement amount in the displacement direction.

factor=min(1.0,smoothness*abs(vertex_weight))

direction.Scale(factor)

$$\text{newVertexPos=currentVertexPos+direction} \quad (1)$$

In this example, smoothness is a smoothness parameter that indicates how mush smoothing should be applied, vertex_weight is the displacement weight, direction is the displacement direction, currentVertexPos is the original vertex position and newVertexPos is the final vertex positon.

Once the vertices within the fitted shape have been moved for the tile, execution proceeds to step 1340, where the editor 425 determines whether the computation of weights and moving of vertexes of the tile should be repeated, based on whether a number of iterations has been reached. If not, another iteration is performed, with execution looping back to step 1320. If so, execution proceeds to step 1350, where the editor 425 determines if there are any remaining tiles within the set of tiles. If so, at step 1360, the editor 425 selects another tile of the set of tiles that has vertices within the fitted shape, and then execution proceeds loops back to step 1320. If not, execution proceeds to step 1370, where modify vertices are returned, which may be stored in edited tiles.

Figure 15:
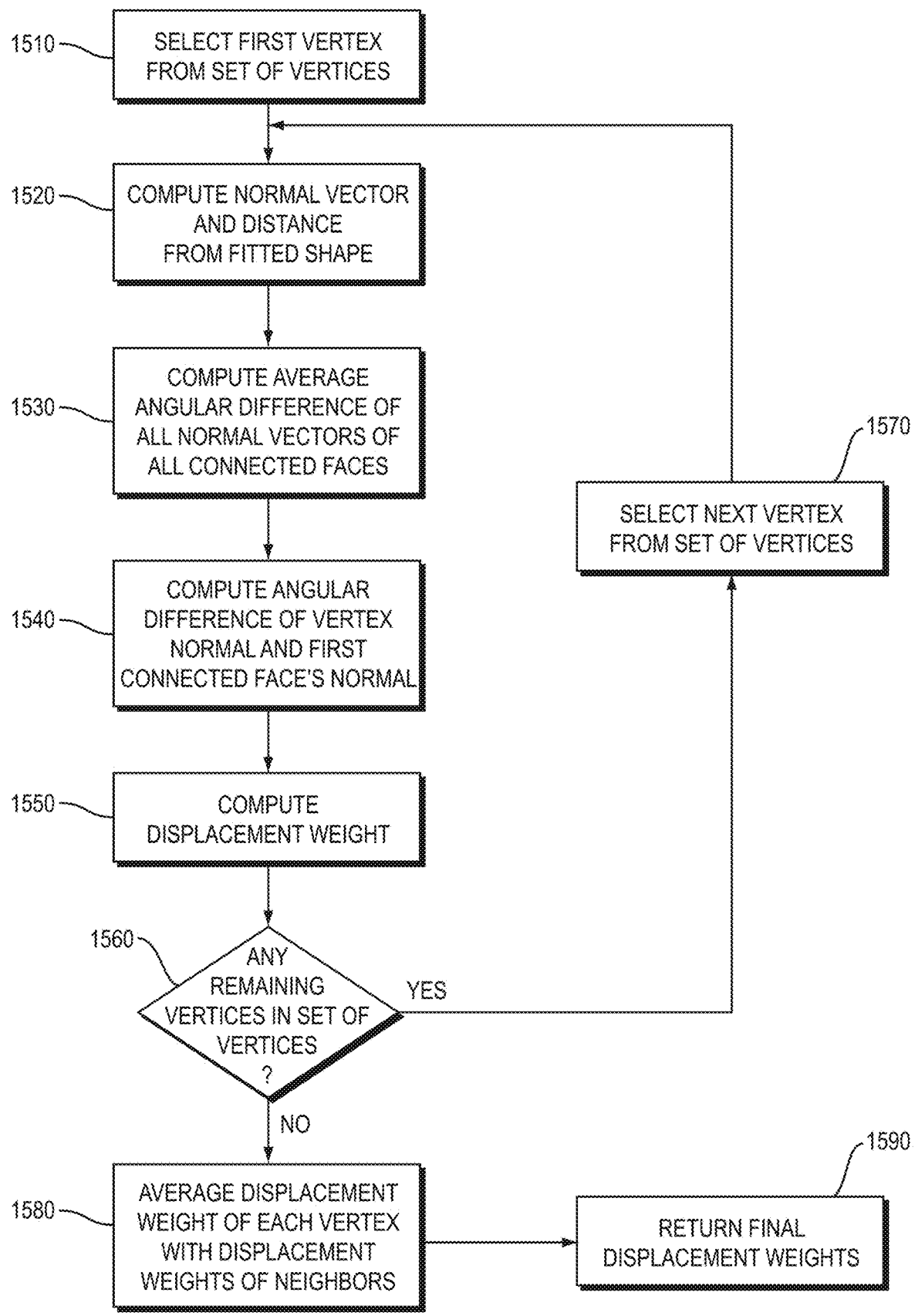
FIG. 15 is a flow diagram of an example sequence of steps that may be executed as part of a step to compute displacement weights.

As mentioned above, the editor may compute the displacement weights using an algorithm that yields weights that are generally inversely proportional to the distance of the vertex to the surface of the fitted shape. FIG. 15 is a flow diagram of an example sequence of steps 1500 that may be executed as part of step 1320 to compute the displacement weights. At step 1510, the editor 425 selects one vertex from the set of vertices within the fitted shape. At step 1520, the editor 425 computes a normal vector from the vertex to the surface of the fitted shape and a distance along this normal vector between the vertex and the surface of the fitted shape. At step 1530, the editor computes an average angular difference between the normal vectors of all faces connected to the vertex.

Figure 16:
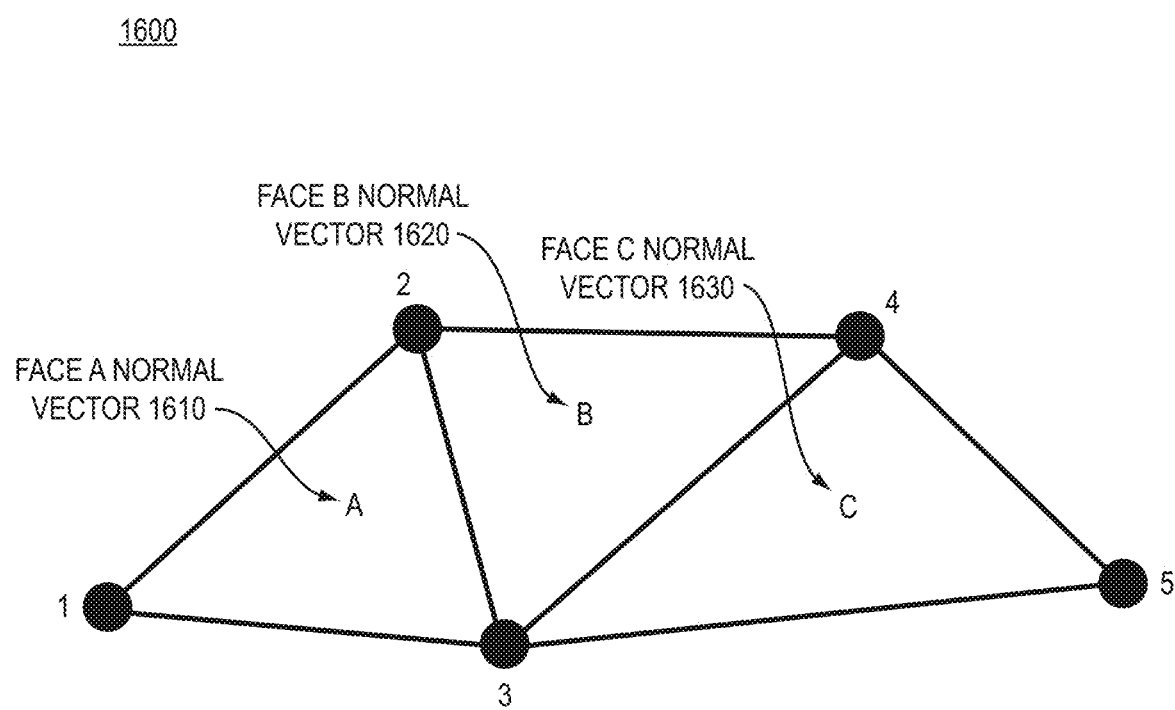
FIG. 16 is a diagram that illustrates normal vectors of faces connected to a vertex for a small example mesh.

FIG. 16 is a diagram 1600 that illustrates normal vectors of faces connected to the vertex for a small example mesh. In this example, vertex 3 is connected to faces A, B and C, each of which has a respective normal vector 1610, 1620, 1630. The average angular difference for vertex 3 would thereby be computed between the normal vectors 1610, 1620, 1630 of faces A, B and C. Likewise, vertex 2 is connected to faces A and B, each of which has a respective normal vector 1610, 1620. The average angular difference for vertex 2 would thereby be computed between the normal vectors 1610, 1620 of faces A and B. Further, vertex 1 is connected to just faces A, which has a respective normal vector 1610. As there is only one normal vector, the average angular distance for vertex 1 would be 0.

Returning to FIG. 15, at step 1540, the editor 425 computes the angular difference between the normal vector of a first connected face of the vertex and the normal vector from the vertex to the surface of the fitted shape from step 1520. Then, at step 1550, the editor 425 combines these computed quantities to compute a displacement weight of the vertex. Pseudocode 2 below illustrates an example for determining a displacement weight of a vertex.

$$\text{vertex\_weight} = (1/\text{pow}(5*\text{dist},2))*\min(2.0,(1/(\text{avgAngleAround}/(0.1*\pi/2)))*(1/\text{pow}(\text{angleToPlane}/(0.1*\pi/2),2))) \quad (2)$$

In this example, vertex_weight is the displacement weight of a vertex, dist is the distance along the vertex normal vector between the vertex and the surface of the fitted shape, avgAngleAround is the average angular difference of the vertex, and angleToPlane is the angular difference between the normal vector of a first connected face of the vertex and the normal vector from the vertex to the surface of the fitted shape.

After computing the displacement weight of the vertex, at step 1560, the editor 425 determines if there are any remaining vertices in the set of vertices within the fitted shape. If so, at step 1570, a next vertex in the set of vertices within the fitted shape is selected, and execution loops back to step 1520 to process that vertex. If not, execution proceeds to step 1580, where the editor averages the displacement weight of each vertex with displacement weights of its neighboring vertices to produce a final displacement weight of each vertex. For example, referring again to FIG. 16, for vertex 2 the displacement weight of vertex 2 may be averaged with the displacement weights of vertices 1, 3 and 4 to produce a final displacement weight of vertex 2. Such averaging may help ensure that smoothing is more area centric than point centric, which might defeat the smoothing purposes (e.g., if a given vertex has a much greater displacement weight than neighboring vertices it may be moved disproportionately far creating a peak).

Pseudocode 3 below illustrates an example of averaging the displacement weight of a vertex with displacement weights of neighboring vertices to produce a final displacement weight.

$$\text{vertex\_weight} = 0.5*(\text{vertex\_weight} + \text{totalNeighborWeights}/\text{nbNeighborVertices}) \quad (3)$$

In this example, vertex_weight is the displacement weight of a vertex, totalNeighborWeights is the sum of displacement weights of neighboring vertices and nbNeighborVertices is the number of neighboring vertices. Finally, at step 1590, the editor 425 returns the final displacement weights of each of the vertices.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for smoothing bumpiness in a multi-resolution mesh, comprising:
   determine a capture shape that encompasses a portion of the multi-resolution mesh;
   extracting, by an application executing on a computing device, a set of vertices of the multi-resolution mesh that include vertices that intersect the capture shape or a shape derived from the captured shape through geometric operations;
   generating, by the application, a fitted shape from the extracted set of vertices that more precisely defines the portion of the multi-resolution mesh to be smoothed, the fitted shape to have at least one of a different size or a different orientation than the capture shape;
   modifying, by the application, vertices that fall within or within a predetermined distance from the fitted shape to change their coordinates to smooth the portion of the multi-resolution mesh; and
   persisting the modified vertices to a storage device for subsequent display or analysis.

2. The method of claim 1, wherein the multi-resolution mesh is a multi-resolution textured mesh.

3. The method of claim 2, wherein the multi-resolution mesh is stored on the storage device as a plurality of tiles at different resolutions and the method further comprises:
   requesting tiles of the multi-resolution mesh at different resolutions that intersect the capture shape, and
   wherein the persisting creates edited tiles at different resolutions that include the modified vertices that are stored to the storage device.

4. The method of claim 2, wherein the extracting the set of vertices further comprises:
   selecting a resolution;
   querying for tiles at the selected resolution to obtain a set of tiles; and
   for each tile of the set of tiles, adding vertices of the tile that intersect the capture shape to the set of vertices.

5. The method of claim 4, wherein the extracting further comprises:
   comparing a number of vertices in the set of vertices to a threshold number; and
   in response to the number of vertices exceeding the threshold number, selecting a different resolution and repeating the querying and adding.

6. The method of claim 2, wherein the generating the fitted shape further comprises:
   accessing the extracted set of vertices;
   applying a random sample consensus (RANSAC) algorithm to the extracted set of vertices; and
   returning the fitted shape.

7. The method of claim 2, wherein the modifying vertices further comprises:
   for each tile of the set of tiles,
      computing displacement weights for each of the vertices within the fitted shape,
      moving vertices within the fitted shape in a displacement direction by a displacement amount based at least in part on the displacement weight, and
      repeating the computing displacement weights and the moving vertices for a number of iterations.

8. The method of claim 1, wherein the extracted set of vertices includes vertices that are outside the capture shape but within a tolerance distance thereof.

9. The method of claim 1, wherein the fitted shape is a same type of shape as the capture shape.

10. The method of claim 9, wherein the fitted shape is a cylinder and the capture shape is a cylinder.

11. The method of claim 10, wherein the fitted shape is a different type of shape than the capture shape.

12. The method of claim 11, wherein the fitted shape is a rectangular prism and the capture shape is a plane.

13. A computing device comprising:
a processor; and
a memory coupled to the processor and configured to store a multi-resolution mesh and an editor, the editor when executed operable to:
determine a capture shape that encompasses a portion of the multi-resolution mesh,
extract a set of vertices of the multi-resolution mesh that include vertices that intersect the capture shape,
generate a fitted shape from the extracted set of vertices, the fitted shape to have at least one of a different size or a different orientation than the capture shape,
modify vertices of the fitted shape to change their coordinates to smooth the portion of the multi-resolution mesh, and
persist the modified vertices to the memory.

14. The computing device of claim 13, wherein the multi-resolution mesh is a multi-resolution textured mesh that is stored as a plurality of tiles at different resolutions and the editor when executed is further operable to:
request tiles of the multi-resolution mesh at different resolutions that intersect the capture shape, and
create edited tiles at different resolutions that include the modified vertices that are stored.

15. The computing device of claim 13, wherein the extracted set of vertices includes vertices that are outside the capture shape but within a tolerance distance thereof.

16. A non-transitory electronic-device readable medium having instructions stored thereon, the instructions when executed by one or more electronic devices operable to:
extract a set of vertices of a multi-resolution mesh that include vertices that intersect a capture shape;
generate a fitted shape from the extracted set of vertices that more precisely defines the portion of the multi-resolution mesh to be smoothed, the fitted shape to have at least one of a different size or a different orientation than the capture shape;
compute displacement weights for each of the vertices within the fitted shape;
move vertices within the fitted shape in a displacement direction by a displacement amount based at least in part on the displacement weight to create modified vertices; and
persist the modified vertices for subsequent display or analysis.

17. The non-transitory electronic-device readable medium of claim 16, wherein the multi-resolution mesh is a multi-resolution textured mesh.

18. The non-transitory electronic-device readable medium of claim 17, wherein the multi-resolution mesh is stored as a plurality of tiles at different resolutions and the instructions when executed are further operable to:
request tiles of the mesh at different resolutions that intersect the capture shape; and
create edited tiles at different resolutions that include the modified vertices.

19. The non-transitory electronic-device readable medium of claim 17, wherein the instructions when executed are further operable to:
select a resolution;
query or tiles at the selected resolution to obtain a set of tiles; and
for each tile of the set of tiles, add vertices of the tile that intersect the capture shape to the set of vertices.

20. The non-transitory electronic-device readable medium of claim 17, wherein the instructions when executed are further operable to:
access the extracted set of vertices;
apply a random sample consensus (RANSAC) algorithm to the extracted set of vertices; and
return the fitted shape.

* * * * *

UNITED STATES PATENT AND TRADEMARK OFFICE
CERTIFICATE OF CORRECTION

PATENT NO. : 10,937,236 B1
APPLICATION NO. : 16/680081
DATED : March 2, 2021
INVENTOR(S) : Mathieu St-Pierre et al.

Page 1 of 1

It is certified that error appears in the above-identified patent and that said Letters Patent is hereby corrected as shown below:

In the Specification

Column 3, Line 20:
Delete "generated by SfN photogrammetry that includes unwanted"
Insert -- generated by SfM photogrammetry that includes unwanted --

Column 3, Line 23:
Delete "structure with windows generated by SfN photogrammetry"
Insert -- structure with windows generated by SfM photogrammetry --

Column 3, Line 26:
Delete "by SfN photogrammetry that includes unwanted bumpiness;"
Insert -- by SfM photogrammetry that includes unwanted bumpiness; --

Column 3, Line 28:
Delete "software architecture for a SfN photogrammetry application"
Insert -- software architecture for a SfM photogrammetry application --

In the Claims

Column 12, Line 28:
Claim 19:
Delete "query or tiles at the selected resolution to obtain a set of"
Insert -- query for tiles at the selected resolution to obtain a set of --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*